June 24, 1930.   F. P. LIVINGSTON   1,765,376
AUTOMOTIVE BRAKE DIAPHRAGM
Filed Jan. 13, 1926
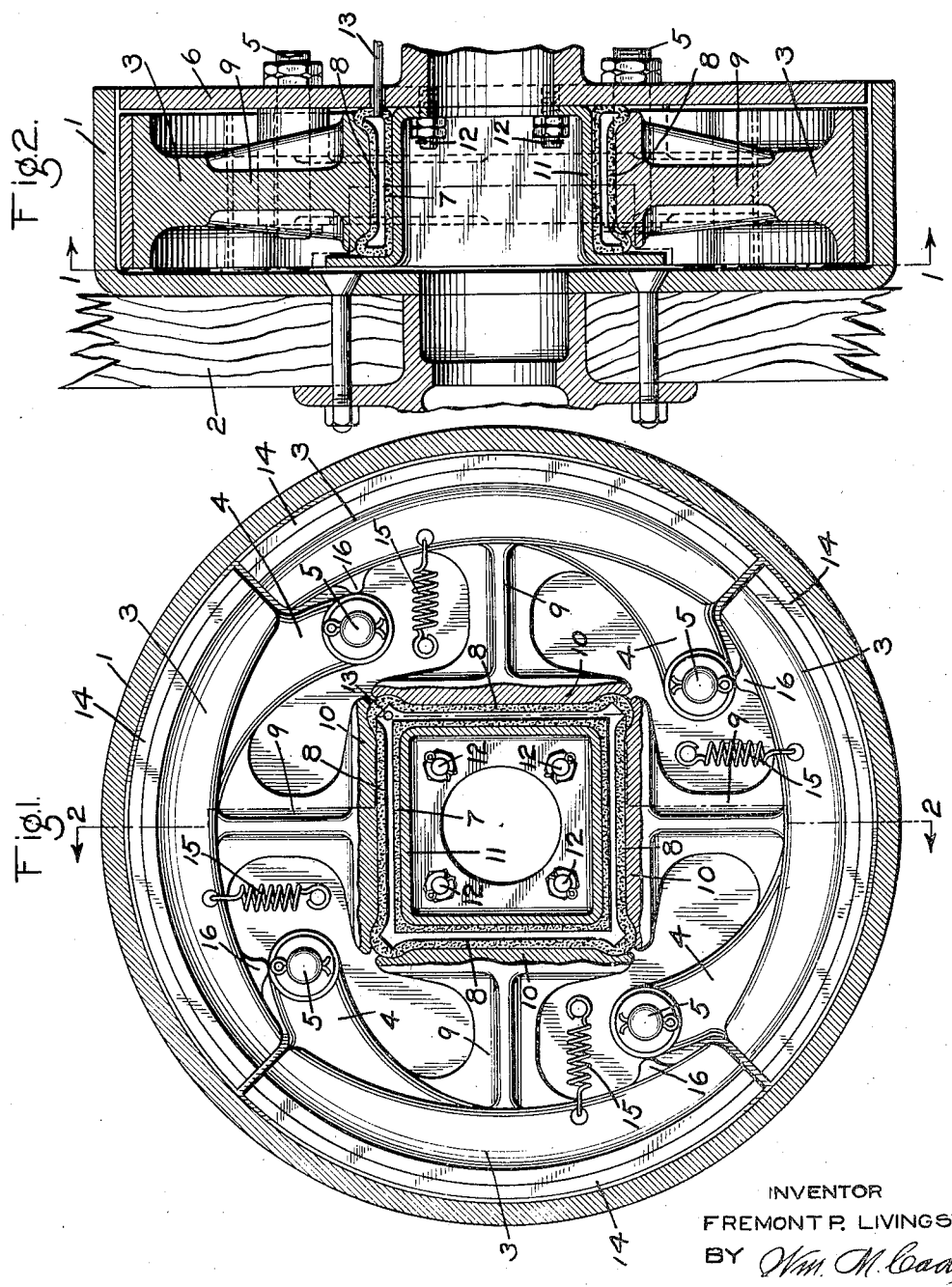
INVENTOR
FREMONT P. LIVINGSTON
BY *Wm. M. Cady*
ATTORNEY Patented June 24, 1930

1,765,376

UNITED STATES PATENT OFFICE

FREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE DIAPHRAGM

Application filed January 13, 1926. Serial No. 81,101.

This invention relates to vehicle brakes, and more particularly to a vehicle brake adapted to be operated by fluid under pressure.

The principal object of my invention is to provide an internal expanding drum type of brake having the brake chamber enclosed within the drum.

In the accompanying drawing; Fig. 1 is a section on the line 1—1 of Fig. 2, of an internal expanding drum type of brake embodying my invention; and Fig. 2 a section on the line 2—2 of Fig. 1.

As shown in the drawing, the construction may comprise a brake drum 1 secured to a vehicle wheel 2, which may be either a front or rear wheel, and having an internal friction face.

Mounted within the brake drum 1 are brake heads 3, four being shown, although three or any additional number may be employed. The brake heads 3 are each provided near one end at the inner face with a lug 4 having a bore, through which extends a pivot pin 5, said pins being secured to the usual brake drum cover plate 6.

Within the drum 1 and spaced from the drum axis is disposed a collapsible brake chamber 7, which is made of flexible material, such as rubber, and which is provided with expansible and contractible side walls 8, corresponding in number with the number of brake shoes which may be employed.

Each brake head with a centrally disposed, inwardly extending lug 9 having at its inner end a pressure plate 10 adapted to engage a corresponding side wall 8 of the brake chamber 7. The inner walls of the brake chamber are supported by a rectangular frame 11 which is secured by studs 12 to the cover plate.

Extending through an opening in the cover plate 6 is a pipe 13 which is connected to the brake chamber 7 and through which fluid under pressure is supplied to and released from said chamber.

When fluid under pressure is supplied through pipe 13 to the brake chamber 7, the side walls 8 thereof are expanded or moved outwardly, causing a corresponding outward movement of the pressure plates 10. The brake heads 3 are thus rocked about the pivot pins 5, so that the brake shoes 14 carried by the heads 3 are brought into engagement with the internal friction face of the brake drum 1 and the brakes are thus applied.

When fluid under pressure is released from the brake chamber 7, the brake heads are moved inwardly away from the brake drum by the release springs 15, the release movement being limited by the engagement of a lug 16, carried by each brake head, with a portion of the lug 4 of the adjacent brake head.

With my invention, each side wall 8 acts as a diaphragm for each corresponding brake head, so that a large diaphragm area is provided for each vehicle wheel for braking purposes, so that a high braking power may be obtained with a relatively low pressure of fluid per square inch and each diaphragm face being directly associated with each brake head, the variation in travel of the diaphragm is limited to the amount the brake shoe wears.

Furthermore, the brake shoes being independently and directly applied to the friction face of the brake drum, the brake shoes will be in contact throughout the circumference of the brake drum, regardless of unequal or varying thickness of the brake shoes.

Having now described my invention, what I claim as new and desire to secure by Letters Patent, is:—

1. In a vehicle brake, the combination with a braking member and a plurality of movable brake heads for engaging said braking member, of a flexible diaphragm having side walls forming a rectangle, with each one of the side walls associated with a corresponding brake head and operated by fluid under pressure for forcing the corresponding brake head into engagement with said braking member.

2. In a vehicle brake, the combination with a brake drum having an internal friction face and a plurality of pivoted brake heads mounted within said drum, of a chamber formed by a flexible diaphragm having flat side walls, each one of which acts on a corresponding brake head and operated by fluid under pressure supplied to said chamber for forcing said brake heads toward said friction face.

3. In a vehicle brake, the combination with a brake drum having an internal friction face, of a plurality of brake heads mounted within said drum and having brake shoes for engaging said friction face, radially movable pressure plates, a spacing member integrally connecting each pressure plate with each brake head, and a centrally disposed brake chamber having a flexible diaphragm provided with flat side walls, each engaging a corresponding pressure plate.

4. In a vehicle brake, the combination with a brake drum, of a plurality of brake heads mounted within said drum and each provided with a flat pressure plate and a brake chamber formed of a flexible diaphragm having pairs of inner end and outer flat walls, the outer flat wall of each pair engaging a corresponding pressure plate and operable by fluid under pressure supplied to said brake chamber.

In testimony whereof I have hereunto set my hand.

FREMONT P. LIVINGSTON.